US012626393B2

(12) United States Patent
Fukuda

(10) Patent No.: US 12,626,393 B2
(45) Date of Patent: May 12, 2026

(54) OBSERVATION DEVICE FOR ESTIMATING A DISTANCE TO AN OBSERVATION TARGET

(71) Applicant: KYOCERA Corporation, Kyoto (JP)

(72) Inventor: Toshinobu Fukuda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 378 days.

(21) Appl. No.: 18/559,583

(22) PCT Filed: May 10, 2022

(86) PCT No.: PCT/JP2022/019858
§ 371 (c)(1),
(2) Date: Nov. 8, 2023

(87) PCT Pub. No.: WO2022/244655
PCT Pub. Date: Nov. 24, 2022

(65) Prior Publication Data
US 2024/0242373 A1     Jul. 18, 2024

(30) Foreign Application Priority Data

May 17, 2021    (JP) ................................. 2021-083486

(51) Int. Cl.
*G06K 9/00*        (2022.01)
*G01B 11/02*       (2006.01)
(Continued)

(52) U.S. Cl.
CPC .............. *G06T 7/70* (2017.01); *G01B 11/026* (2013.01); *G06T 7/337* (2017.01); *G06V 20/52* (2022.01); *G06V 2201/12* (2022.01)

(58) Field of Classification Search
CPC .. G06T 7/337; G06T 7/50; G06T 7/55; G06T 7/60; G06T 7/62; G06T 7/70;
(Continued)

(56) References Cited

U.S. PATENT DOCUMENTS 9,977,973 B2 *   5/2018  Okuda ...................... G06T 7/74
10,051,183 B2 *  8/2018  Yoneda ............... H04N 23/681
(Continued)

FOREIGN PATENT DOCUMENTS

JP        H03-273500 A     12/1991

*Primary Examiner* — Eric Rush
(74) *Attorney, Agent, or Firm* — Studebaker Brackett PLLC

(57)        ABSTRACT

An observation device 10 includes an imaging device 17, storage 18, an acquirer 19, and a controller 20. The imaging device 17 generates an image. The storage 18 stores distance information. The distance information is a relationship between an image position and information pertaining to distance. The acquirer 19 acquires position information pertaining to the spatial position of a moving body. When the distance discrepancy between a measured distance and an estimated distance is at or above the first threshold, the controller 20 corrects the distance information using the measured distance. The measured distance corresponds to the position information. The estimated distance is obtained on the basis of the image position of the moving body in the image and the distance information.

9 Claims, 10 Drawing Sheets

(51) Int. Cl.
    G06T 7/33         (2017.01)
    G06T 7/70         (2017.01)
    G06V 20/52      (2022.01)

(58) Field of Classification Search
    CPC . G06T 2207/10004; G06T 2207/10016; G06T
               2207/20228; G06T 2207/30252; G06T
               2207/30261; G06V 20/10; G06V 20/50;
           G06V 20/52; G06V 2201/12; G01C 3/00;
              G01C 3/06; G01C 3/08; G01C 3/085;
            G08G 1/0116; G08G 1/0175; G08G 1/04;
            G08G 1/048; G08G 1/054; G08G 1/164;
            G01B 11/026; H04N 7/183; H04W 4/44
    USPC ....... 382/100, 103, 104, 106, 107, 154, 159,
               382/160, 224, 226, 291, 312, 325;
            348/61, 113, 116, 118, 135, 143, 148,
            348/149; 356/3, 4.01, 4.03, 11, 14, 15;
           702/85, 86, 94, 95, 97, 108, 127, 158
    See application file for complete search history.

(56)             References Cited

U.S. PATENT DOCUMENTS 10,169,665 B1     1/2019  Zhang et al.
2023/0127218 A1*   4/2023  Hsieh .................. G06V 10/764
                              382/100

* cited by examiner

Figure 6:
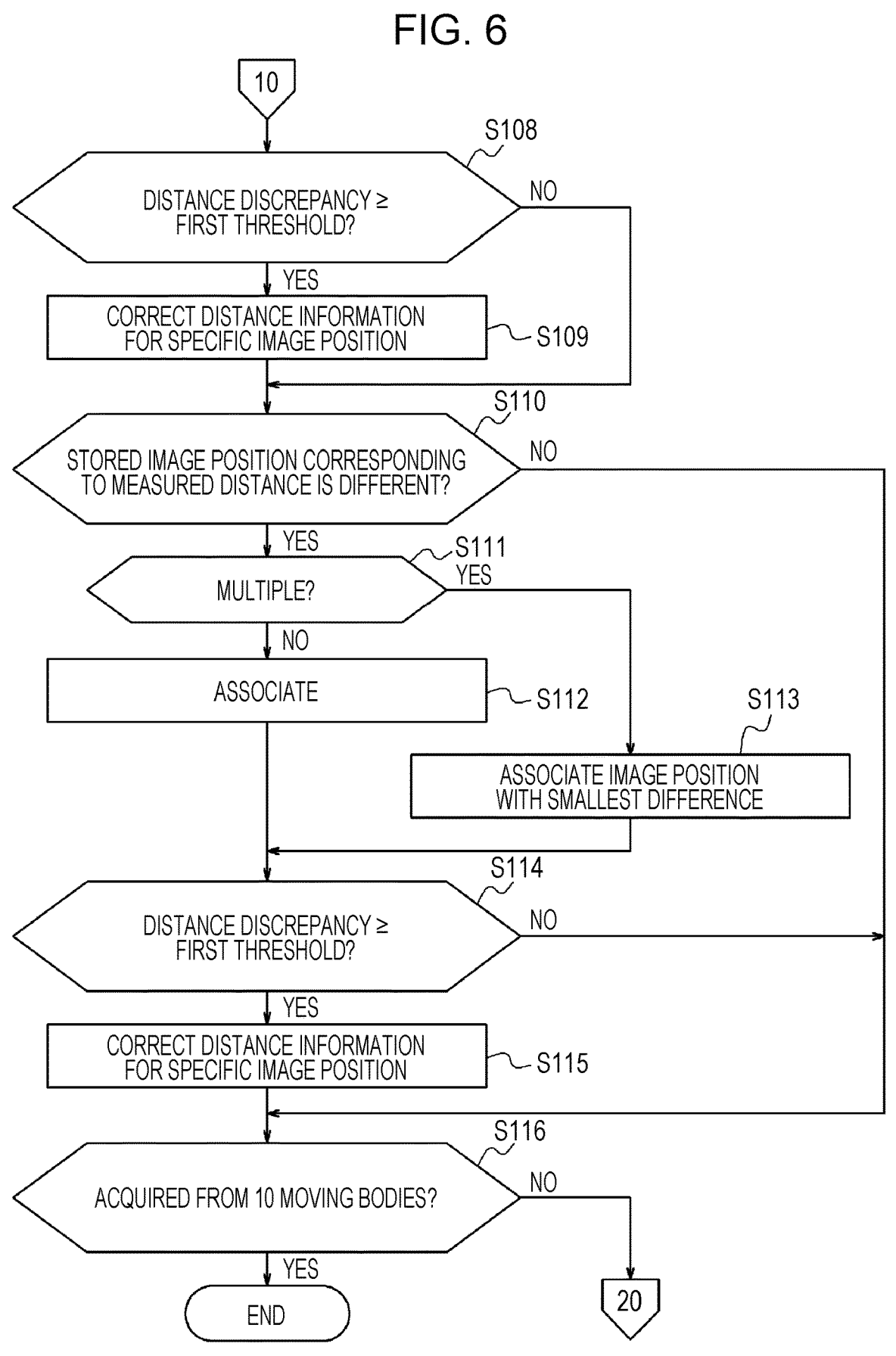

DISTANCE DISCREPANCY ≥ FIRST THRESHOLD?    NO

YES

CORRECT DISTANCE INFORMATION FOR SPECIFIC IMAGE POSITION — S109

S110

STORED IMAGE POSITION CORRESPONDING TO MEASURED DISTANCE IS DIFFERENT?    NO

YES

S111

MULTIPLE?    YES

NO

ASSOCIATE — S112

S113

ASSOCIATE IMAGE POSITION WITH SMALLEST DIFFERENCE

S114

DISTANCE DISCREPANCY ≥ FIRST THRESHOLD?    NO

YES

CORRECT DISTANCE INFORMATION FOR SPECIFIC IMAGE POSITION — S115

S116

ACQUIRED FROM 10 MOVING BODIES?    NO

YES

END

OBSERVATION DEVICE FOR ESTIMATING A DISTANCE TO AN OBSERVATION TARGET

CROSS-REFERENCE TO RELATED APPLICATIONS

This application claims priority based on Japanese Patent Application No. 2021-083486 filed May 17, 2021, the entire disclosure of which is hereby incorporated by reference.

TECHNICAL FIELD

The present disclosure relates to an observation device.

BACKGROUND OF INVENTION

A known sensor generates an image by capturing a predetermined area, like a camera. Various information may be generated from the image. For example, one proposal involves calculating the distance in a real space to a subject corresponding to a subject image on the basis of an installation orientation relative to the ground, such as a road, and the position of the subject image on the ground in an image (see Patent Literature 1).

CITATION LIST

Patent Literature

Patent Literature 1: Japanese Unexamined Patent Application Publication No. 3-273500

SUMMARY

In a first aspect, an observation device estimates a distance to an observation target in a predetermined area. The observation device includes an imaging device, storage, an acquirer, and a controller. The imaging device is configured to generate an image through image capture of a space containing the predetermined area. The storage is configured to store distance information. The distance information indicates a relationship between an image position in the image captured by the imaging device and information pertaining to the distance. The acquirer is configured to acquire, from a moving body, position information pertaining to a spatial position of the moving body. The controller is configured to correct the distance information by using a measured distance corresponding to the position information when a distance discrepancy between the measured distance and an estimated distance is at or above a first threshold. The estimated distance is obtained on a basis of an image position of the moving body in the image and the distance information.

BRIEF DESCRIPTION OF THE DRAWINGS

FIG. 6 is a second flowchart for explaining a correction process in an initial setup mode executed by the controller in FIG. 2.

FIG. 10 is a diagram illustrating a distance estimated on the basis of corrected distance information when distance information corresponding to an inner image position is corrected using a measured distance that has the smallest difference from the measured distance corresponding to a newly calculated distance discrepancy from among a plurality of measured distances.

DESCRIPTION OF EMBODIMENTS

The following refers to the drawings to describe an embodiment of an observation device to which the present disclosure is applied.

Figure 1:
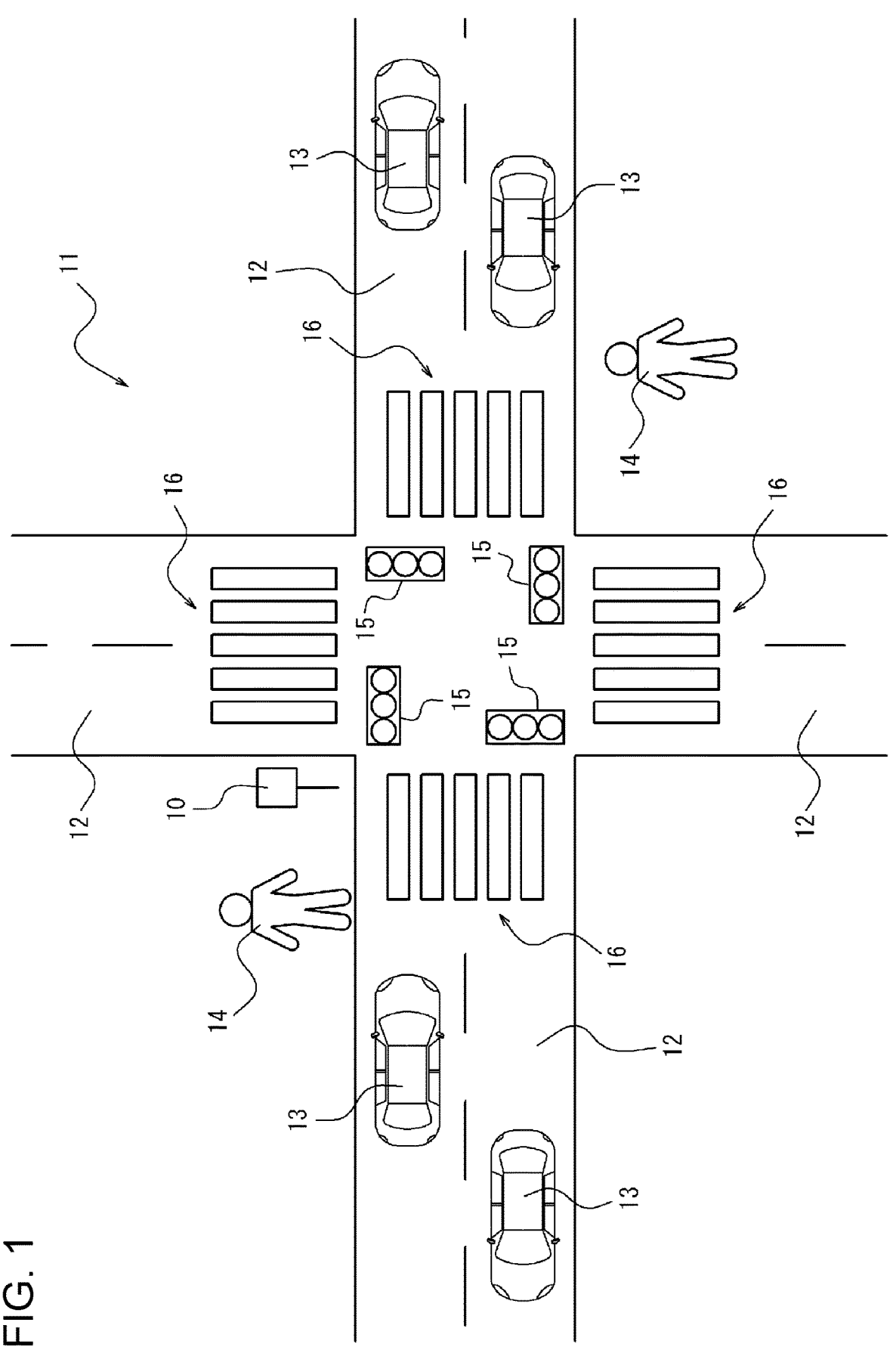
FIG. 1 is a diagram illustrating an example configuration of a communication system including an observation device according to an embodiment.

FIG. 1 is a diagram illustrating an example configuration of a communication system 11 including an observation device 10 according to an embodiment. The communication system 11 is an Intelligent Transport Systems (ITS) safe driving support communication system, for example. A safe driving support communication system is also referred to as a safe driving support system or a safe driving support wireless system.

The observation device 10 may be a device that observes observation targets, such as vehicles, objects, and people, on a road in a predetermined area. The observation device 10 is a roadside unit or a monitoring camera device, for example. In the present embodiment, the observation device 10 is a roadside unit that may be disposed near an intersection where a plurality of roads 12 (streets) intersect to observe the road surface. The observation device 10 may be disposed at a roadside other than an intersection.

In the communication system 11, the observation device 10 and a moving body 13, such as an automobile traveling on the roads 12, may communicate with each other wirelessly. A plurality of moving bodies 13 may communicate with one another wirelessly. An electronic device carried by a pedestrian 14 may also communicate wirelessly in the communication system 11. The electronic devices are mobile terminal devices such as smartphones, for example.

The observation device 10 may notify the moving body 13 of support information for supporting safe driving by the driver of the moving body 13. The support information may include information pertaining to an observation target present on the observed road. Information pertaining to an observation target may include the presence or absence of an observation target, the type of observation target that is present, the distance to the observation device 10, the speed, and the direction of travel. The support information may include information pertaining to the lighting of a traffic signal 15, information pertaining to road regulations, and road alignment information indicating, among other things, the shape of the intersection (the shapes of the roads 12) where the observation device 10 is disposed. The support information may include information reported by another moving body 13. The observation device 10 may report the support information to the electronic device carried by the pedestrian 14.

Each moving body 13 detects the spatial position of the moving body 13 in the real space using a global navigation satellite system (GNSS) or other positioning device, for example. The spatial position of the moving body 13 may be a position in a world coordinate system. The world coordinate system is a coordinate system set in a three-dimensional space defined in the GNSS.

The moving body 13 may transmit moving body information, including at least position information pertaining to the spatial position of the moving body 13, to the observation device 10 and the like periodically, for example. The position information pertaining to the spatial position may be not only the spatial position itself, but also other information that can be used to specify the spatial position. The moving body information may further include information pertaining to speed and direction indicators.

The moving body 13 may acquire various information reported by the observation device 10 and the like via an onboard electronic device. The electronic device onboard the moving body 13 is a car navigation system, for example. The electronic device onboard the moving body 13 may support safe driving by the driver by notifying the driver of warnings and the like on the basis of the support information reported by the observation device 10. A notification to the driver may indicate the type, position, speed, direction of travel, and the like of an observation target such as another moving body 13 approaching in the vicinity of the intersection, and indicate the presence of the pedestrian 14 at a pedestrian crossing 16 in the vicinity of the intersection.

As above, the communication system 11 may support safe driving by the driver of the moving body 13. The moving body 13 is not limited to an automobile. For example, the moving body 13 may include a motorcycle, a bus, a tram, and a bicycle.

The following describes details of the observation device 10. The observation device 10 estimates the distance to an observation target in a predetermined area. The distance that the observation device 10 estimates is a distance obtained on the basis of information indicating a relationship between an image position in an image acquired by the observation device 10 and information pertaining to the distance to the observation target, as described later. The distance to the observation target may be the distance from a freely chosen origin in the real space. The freely chosen origin is, for example, the road surface at the position of the observation device 10 in a vertically overhead view of the three-dimensional real space.

Figure 2:
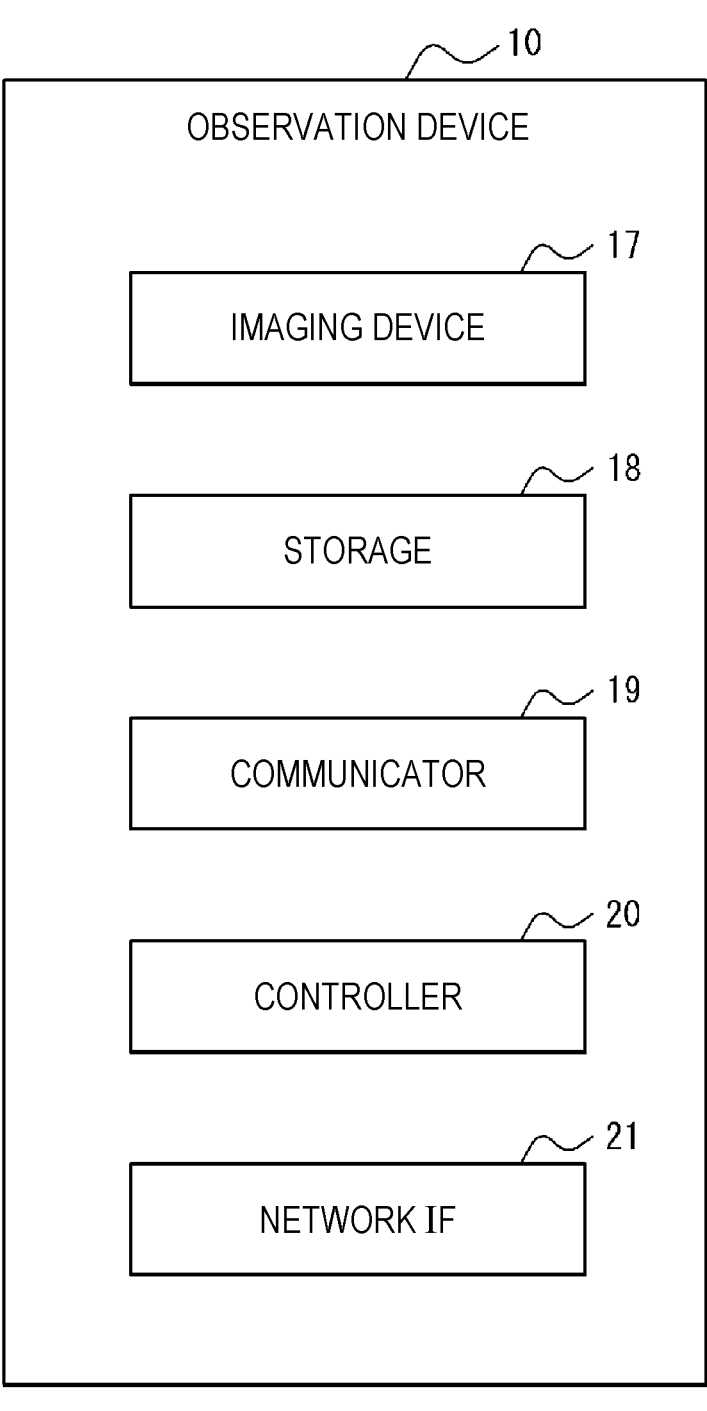
FIG. 2 is a block diagram illustrating a schematic configuration of the observation device in FIG. 1.

As illustrated in FIG. 2, the observation device 10 includes an imaging device 17, storage 18, a communicator (acquirer) 19, and a controller 20. The observation device 10 may further include a network IF 21.

The imaging device 17 generates an image by capturing a space containing the predetermined area described above. The imaging device 17 is a single-lens camera, for example. The single-lens camera may be a visible light camera or a FIR camera. The imaging device 17 may generate the image at a certain frame rate such as 30 fps, for example.

The imaging device 17 may have a predefined camera coordinate system. The camera coordinate system may be a three-dimensional coordinate system having an origin located at any position in the imaging device 17, with three mutually perpendicular axes passing through the origin as coordinate axes. The origin of the camera coordinate system is at the intersection point between a detection axis and an image sensor of the imaging device 17, for example. The camera coordinate system includes an optical axis among the coordinate axes, for example. The optical axis may pass through the center of a detection range of the image sensor.

Figure 3:
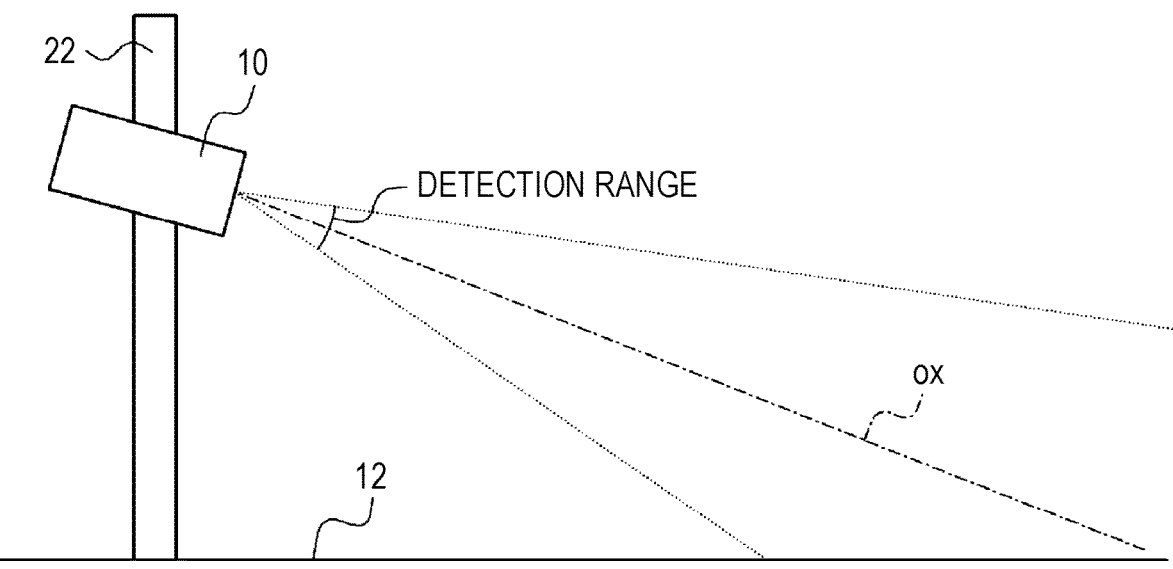
FIG. 3 is a state diagram illustrating a fixed state of the observation device in FIG. 1.

As illustrated in FIG. 3, the observation device 10 may be secured to a structure 22 with height allowing for imaging of an outdoor scene that includes the roads 12. The structure may be a signal device, a utility pole, or a streetlight near the intersection where the roads 12 to be observed intersect, for example. The position and orientation of the imaging device 17 with respect to the structure 22 may be fixed in advance.

The position of the imaging device 17 means the origin of the camera coordinate system relative to a reference position in a surrounding space coordinate system defined around the observation device 10. The orientation of the imaging device 17 means the tilt of the coordinate axes of the camera coordinate system relative to the coordinate axes of the surrounding space coordinate system. The surrounding space coordinate system may have the vertical direction in the real space and two mutually perpendicular directions parallel to the horizontal plane as axes.

The position and orientation of the imaging device 17 may be fixed so that the optical axis ox of the imaging device 17 intersects the road surface of the roads 12. The position and orientation of the imaging device 17 may be fixed so that the detection range of the imaging device 17 includes a predetermined area defined relative to the observation device 10.

In FIG. 2, the storage 18 includes a storage device of any kind, such as random access memory (RAM) and read-only memory (ROM), for example. The storage 18 may store various programs for causing the controller 20 to exhibit functionality and various information to be used by the controller 20.

The storage 18 stores distance information. Distance information is information indicating a relationship between an image position in an image captured by the imaging device 17 and information pertaining to the distance to the observation target. A pixel in an image acquired from the imaging device 17 may indicate an object on a road surface or floor surface. In this case, the image position in an image may be specifically the coordinates of the pixel in a two-dimensional image coordinate system. The information pertaining to the distance to the observation target may be specifically the distance from a freely defined origin in the surrounding space coordinate system. The origin in the surrounding space coordinate system is the road surface at the position of the observation device 10 in a vertically overhead view of the three-dimensional real space.

The distance information may be a formula or table for converting from an image position in an image to information pertaining to distance. The conversion formula or conversion table may be created in advance on the basis of the characteristics of the image sensor and optical system in the imaging device 17 and the position and orientation of the imaging device 17 relative to the roads 12. The conversion formula or conversion table may be further calibrated using a target or the like placed on the road surface.

The storage 18 may store the origin position of the surrounding space coordinate system in the world coordinate system. The storage 18 may store the orientation of the surrounding space coordinate system in the world coordinate system. The orientation of the surrounding space coordinate system is the tilt of the coordinate axes of the surrounding space coordinate system from the coordinate axes of the world coordinate system. The origin position and orientation of the surrounding space coordinate system in the world coordinate system may be stored in the storage 18 by being measured during installation of the observation device 10 and inputted using an input device, for example.

The communicator 19 may communicate wirelessly with the moving body 13, under control by the controller 20. The communicator 19 may include a communication circuit and an antenna. The antenna may be a nondirectional antenna, for example. The communicator 19 may communicate wirelessly using the 700 MHz band allocated to ITS, for example. The communicator 19 may communicate wirelessly using a wireless local area network (LAN), for example.

The communicator 19 may perform various processing such as amplification processing on a signal received at the antenna. The communicator 19 may output a processed reception signal to the controller 20. For example, the communicator 19 acquires, from the moving body 13, information pertaining to the spatial position of the moving body 13. The controller 20 may perform various processing on an inputted reception signal to obtain information included in the reception signal. The communicator 19 may perform various processing such as amplification processing on information obtained from the controller 20. The communicator 19 may wirelessly transmit a processed transmission signal from the antenna.

The controller 20 includes at least one processor and a memory. The processor may include a general-purpose processor that loads a specific program to execute a specific function, and a special-purpose processor dedicated to a specific process. The special-purpose processor may include an application-specific integrated circuit (ASIC). The processor may include a programmable logic device (PLD). The PLD may include a field-programmable gate array (FPGA). The controller 20 may also be a system-on-a-chip (SoC) or a system in a package (SiP) in which one or more processors cooperate.

The controller 20 may determine the presence or absence of an observation target in a predetermined area on the basis of an image obtained from the imaging device 17. Specifically, the controller 20 detects a subject image corresponding to a subject to be observed through known image recognition such as pattern matching or deep learning applied to the image. The controller 20 may determine the presence or absence of an observation target through detection of the subject image.

If an observation target is present, the controller 20 may identify the type of observation target on the basis of an observation result from the imaging device 17. Specifically, the controller 20 detects the subject image and determines the type of observation target through image recognition.

If an observation target is present, the controller 20 may acquire, on the basis of the image, an estimated distance to the position where the observation target is present. The acquisition of the estimated distance is, for example, calculation by the controller 20. Specifically, the controller 20 may calculate the estimated distance to the observation target by using distance information to convert an image position to the surrounding space coordinate system. The image position to be converted is a position in the two-dimensional coordinate system of a pixel in the portion of the detected subject image that is in contact with the road surface.

The controller 20 may identify the speed and direction of travel of the detected observation target on the basis of a plurality of detection signals with consecutive detection times.

If at least one observation target is present, the controller 20 may generate support information including the type of observation target, estimated distance, speed, and direction of travel. The controller 20 may control the communicator 19 to report the generated support information to the moving body 13 around the observation device 10.

If the controller 20 obtains moving body information from the moving body 13, the controller 20 may correct the distance information as described below. To correct the distance information, the controller 20 may extract position information on the moving body 13 included in the moving body information. The controller 20 calculates a measured distance of the moving body 13 on the basis of the position information on the moving body 13. Specifically, the controller 20 first converts the position information on the moving body 13 corresponding to coordinates in the world coordinate system to position information in the surrounding space coordinate system. This conversion is based on the origin position and orientation of the surrounding space coordinate system in the world coordinate system. The controller 20 calculates the distance from the origin of the surrounding space coordinate system to the position of the moving body 13 in the surrounding space coordinate system as the measured distance.

The controller 20 may detect a subject image of the moving body 13 through the above determination of the presence or absence of an observation target and type identification from an image in substantially the same time period as the moving body information. An image in substantially the same time period as the moving body information is, for example, an image captured at the time closest to the time when the spatial position was detected in the moving body 13. The image in substantially the same time period as the moving body information is obtained from among a plurality of images captured consecutively at a predetermined frame rate. However, the image in substantially the same time period as the moving body information need not be strictly limited to an image captured at the time closest to the time when the spatial position was detected in the moving body 13. The image in substantially the same time period as the moving body information may be an image that could be considered an image captured at the time closest to the time when the spatial position was detected in the moving body 13, such as an image obtained in the same time period as the moving body information, for example.

The controller 20 uses the image as a basis for calculating the estimated distance to the moving body 13 corresponding to the detected subject image. The controller 20 may associate the calculated measured distance and the calculated estimated distance. If a single subject image of the moving body 13 is detected in a single image, the controller 20 may associate the calculated estimated distance with the calculated measured distance. If a plurality of subject images of the moving body 13 are detected in a single image, the controller 20 may stop the association and correction of distance information, or associate the estimated distance that has the smallest distance from the measured distance with the measured distance.

The controller 20 calculates a distance discrepancy. The distance discrepancy is the difference between the measured distance and the estimated distance associated with each other. The controller 20 compares the distance discrepancy to a first threshold. The first threshold is the error to be tolerated when an estimated distance is included as support information. The first threshold may be set manually or automatically according to, among other things, the speed limit on the roads 12 that the observation device 10 observes.

The controller 20 may store the calculated distance discrepancy, the measured distance used to calculate the distance discrepancy, and the image position corresponding to the estimated distance used to calculate the distance discrepancy in association with each other in the storage 18.

Figure 4:
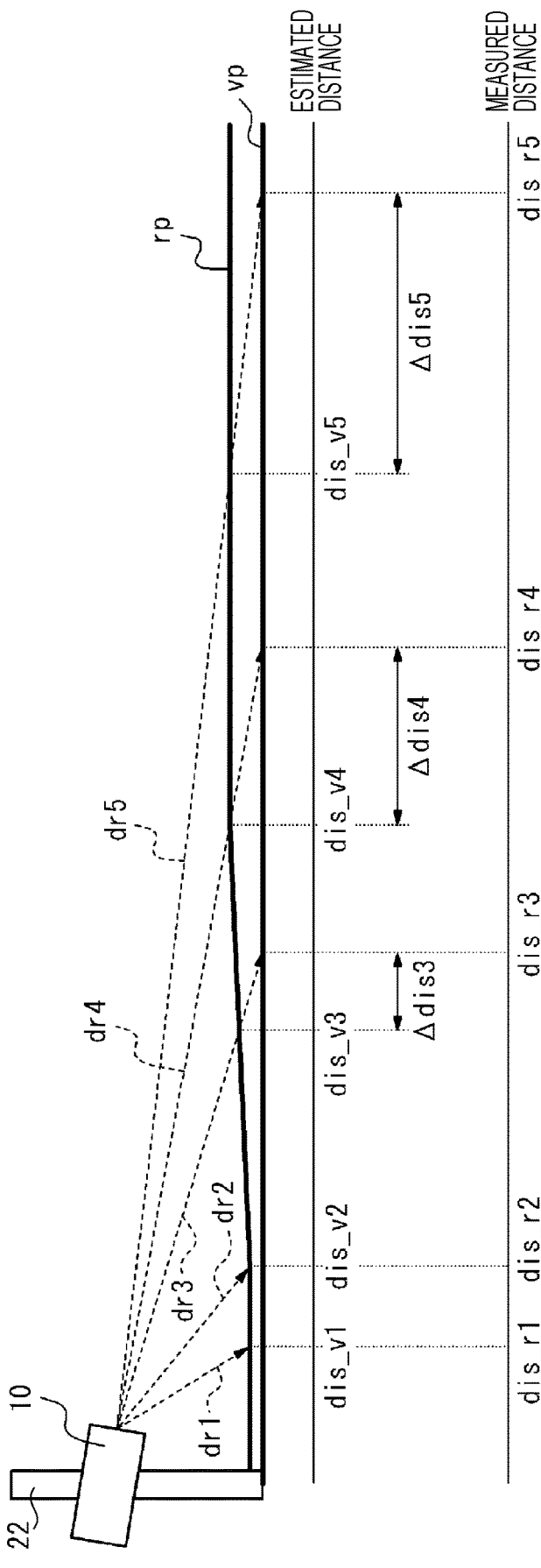
FIG. 4 is a state diagram for explaining how distance discrepancy occurs due to discrepancy between a real road surface and a virtual plane.

As illustrated in FIG. 4, in the calculation of the estimated distance using an image from a single-lens camera, a correspondence relationship is defined on the assumption that the road surface of the roads 12 or the like in the real space forms a single virtual plane vp. The image position corresponds to the direction of the observation device 10. The intersection point between a line extending from the observation device 10 in each direction corresponding to a respective image position and the virtual plane vp corresponds to the estimated distance. The intersection point between a line extending from the observation device 10 in each direction corresponding to a respective image position and the real plane rp of the actual roads 12 corresponds to the measured distance. If the vertical height of the real plane rp of the actual roads 12 differs from the height of the virtual plane vp, a distance discrepancy occurs between the estimated distance and the measured distance.

For example, for a first direction dr1 in which the virtual plane vp and the real plane rp have the same vertical height, the estimated distance dis_v1 and the measured distance dis_r1 are the same, and the distance discrepancy is zero. For a second direction dr2 in which the virtual plane vp and the real plane rp have the same vertical height, the estimated distance dis_v2 and the measured distance dis_r2 are the same, and the distance discrepancy is zero. For a third direction dr3 in which the virtual plane vp and the real plane rp have different vertical heights, the estimated distance dis_v3 and the measured distance dis_r3 are different, and the distance discrepancy Δdis3 is at or above the first threshold. For a fourth direction dr4 in which the virtual plane vp and the real plane rp have different vertical heights, the estimated distance dis_v4 and the measured distance dis_r4 are different, and the distance discrepancy Δdis4 is at or above the first threshold. For a fifth direction dr5 in which the virtual plane vp and the real plane rp have different vertical heights, the estimated distance dis_v5 and the measured distance dis_r5 are different, and the distance discrepancy Δdis5 is at or above the first threshold.

If the distance discrepancy is at or above the first threshold at the spot where the estimated distance was acquired, the controller 20 corrects the distance information using the measured distance. If the distance information is a conversion table, the controller 20 may correct the distance information by using the measured distance as a replacement, in the conversion table, for the information pertaining to distance corresponding to an image position in the image corresponding to the spot where the estimated distance was acquired. For example, upon calculating the distance discrepancy Δdis2 corresponding to the second direction dr2, the controller 20 uses the value of the measured distance as a replacement, in the conversion table, for the information pertaining to distance for the image position in the image corresponding to the second direction dr2. If the distance information is a conversion formula, the controller 20 may correct the conversion formula so that the measured distance is calculated at the image position used to calculate the estimated distance.

When newly calculating a distance discrepancy, the controller 20 may determine whether the image position associated with the measured distance stored in the storage 18 is different from the image position corresponding to the newly calculated distance discrepancy. The image position corresponding to the distance discrepancy is the image position used to calculate the estimated distance that was used in the calculation of the distance discrepancy. If the image positions are different, the controller 20 may determine whether at least one of the newly calculated distance discrepancy or the stored distance discrepancy corresponding to the measured distance is at or above the first threshold.

If at least one distance discrepancy is at or above the first threshold, the controller 20 may correct the information pertaining to distance in the distance information corresponding to an inner image position between two different image positions. The controller 20 makes the correction using two measured distances corresponding to the two image positions. The inner image position is a position in the image between two different image positions. That is, the inner image position is a position in an image acquired by the imaging device 17 at a spot between coordinates corresponding to two image positions in the surrounding space coordinate system. Specifically, the controller 20 may correct the information pertaining to distance corresponding to the inner image position in the distance information on the basis of the difference between the two measured distances and the difference between two estimated distances corresponding to two image positions, the shorter of the two measured distances, and the difference between the shorter measured distance and the estimated distance corresponding to the inner image position.

As an example, consider an inner image position intermediate between the two positions of the image position corresponding to the second direction dr2 and the image position corresponding to the third direction dr3. For this inner image position, the controller 20 corrects the information pertaining to distance defined by the distance information by using the two measured distances corresponding to the second direction dr2 and the third direction dr3. The controller 20 may distribute the information pertaining to distance for the inner image position so that the image position corresponding to the second direction dr2 and the image position corresponding to the third direction dr3 match the measured distance for each. For example, the controller 20 may set information pertaining to distance for each of a plurality of inner image positions according to the distance in the image (for example, the distance between pixels) to each of the inner image positions.

As an example, consider the case in which the controller 20 stores the measured distance corresponding to the second direction dr2 in the storage 18, and then calculates the distance discrepancy Δdis3 corresponding to the third direction dr3. In this case, the controller 20 replaces the information dis_vx pertaining to distance in the distance information corresponding to any intermediate direction from the second direction dr2 to the third direction dr3 with a corrected distance cdis_vx calculated using formula (1).

[Math. 1]

$$cdis\_vx = dis\_r2 + (dis\_r3 - dis\_r2) \times (dis\_vx - dis\_v2)/(dis\_v3 - dis\_v2) \quad (1)$$

If the distance information is a conversion table, the controller 20 may correct the information pertaining to distance in the conversion table for the image position corresponding to any plurality of intermediate directions from the first direction dr1 to the second direction dr2 by replacing the information with the corrected distance cdis_vx according to the above formula. If the distance information is a conversion formula, the controller 20 may correct the original conversion formula by incorporating formula (1) into the original conversion formula in the intermediate range from the first direction dr1 to the second direction dr2.

Consider the case in which the storage 18 is storing a plurality of measured distances and the controller 20 newly calculates a distance discrepancy. In this case, the controller 20 may correct the distance information corresponding to the inner image position described above by using the measured distance that has the smallest difference from the measured distance corresponding to the newly calculated distance discrepancy from among the plurality of measured distances.

As an example, consider the case in which the controller 20 stores the measured distances dis_r2 and dis_r3 in the storage 18, and then newly calculates the distance discrepancy Δdis4. In this case, the controller 20 corrects the distance information for an image position corresponding to any direction between the third direction dr3 and the fourth direction dr4 by using the measured distance dis_r3 that has the smallest difference from the measured distance dis_r4 corresponding to the distance discrepancy Δdis4.

Consider the case of a plurality of image positions, each having a distance discrepancy that is below the first threshold. In this case, the controller 20 may correct the distance information corresponding to an inner image position by using the image position closest to the image position associated with a distance discrepancy that is at or above the first threshold.

As an example, consider the case in which the controller 20 stores the measured distances dis_r1 and dis_r2 in the storage 18, and then newly calculates the distance discrepancy Δdis3. In this case, the controller 20 corrects the distance information for an image position corresponding to any direction between the second direction dr2 and the third direction dr3 by using the measured distance dis_r2 corresponding to the second direction dr2, which is the image position closest to the image position corresponding to the distance discrepancy Δdis4.

If the distance discrepancy is at or above a second threshold, the controller 20 may not correct the distance information. Instead, the controller 20 may generate warning information warning that the observation device 10 is abnormal. The second threshold may be higher than the first threshold. The controller 20 may control the network IF 21 to transmit the warning information to a server of a user who maintains the observation device 10.

The controller 20 may be capable of switching the operating mode to at least an initial setup mode (initial setup) or a normal mode. The controller 20 may perform the distance information correction described above in one of the initial setup mode or the normal mode. During installation of the observation device 10, the controller 20 may switch to the initial setup mode in response to input using an input device, for example. The controller 20 may switch to the normal mode after the end of the initial setup mode described later.

The controller 20 may perform the distance information correction described above in the initial setup mode. In the initial setup mode, the controller 20 may correct the distance information upon detecting a single subject image of the moving body 13 in a single image. In the initial setup mode, the controller 20 may not associate and correct the distance information upon detecting a plurality of subject images of the moving body 13 in a single image. In the initial setup mode, if the distance discrepancy is at or above the second threshold, the controller 20 may correct the distance information without generating warning information.

The controller 20 may end the initial setup mode and switch to the normal mode if the controller 20 has sufficiently corrected the distance information in the initial setup mode. The condition on sufficiently correcting the distance information may be that the controller 20 has acquired moving body information from ten moving bodies 13, for example. In other words, the condition may be that the controller 20 has acquired a plurality of moving body information from each of ten moving bodies 13 in motion.

The network IF 21 may include a communication module to connect to an external network. The observation device 10 may be connected to the external network through the network IF 21 and communicate information with an external server, for example.

Figure 5:
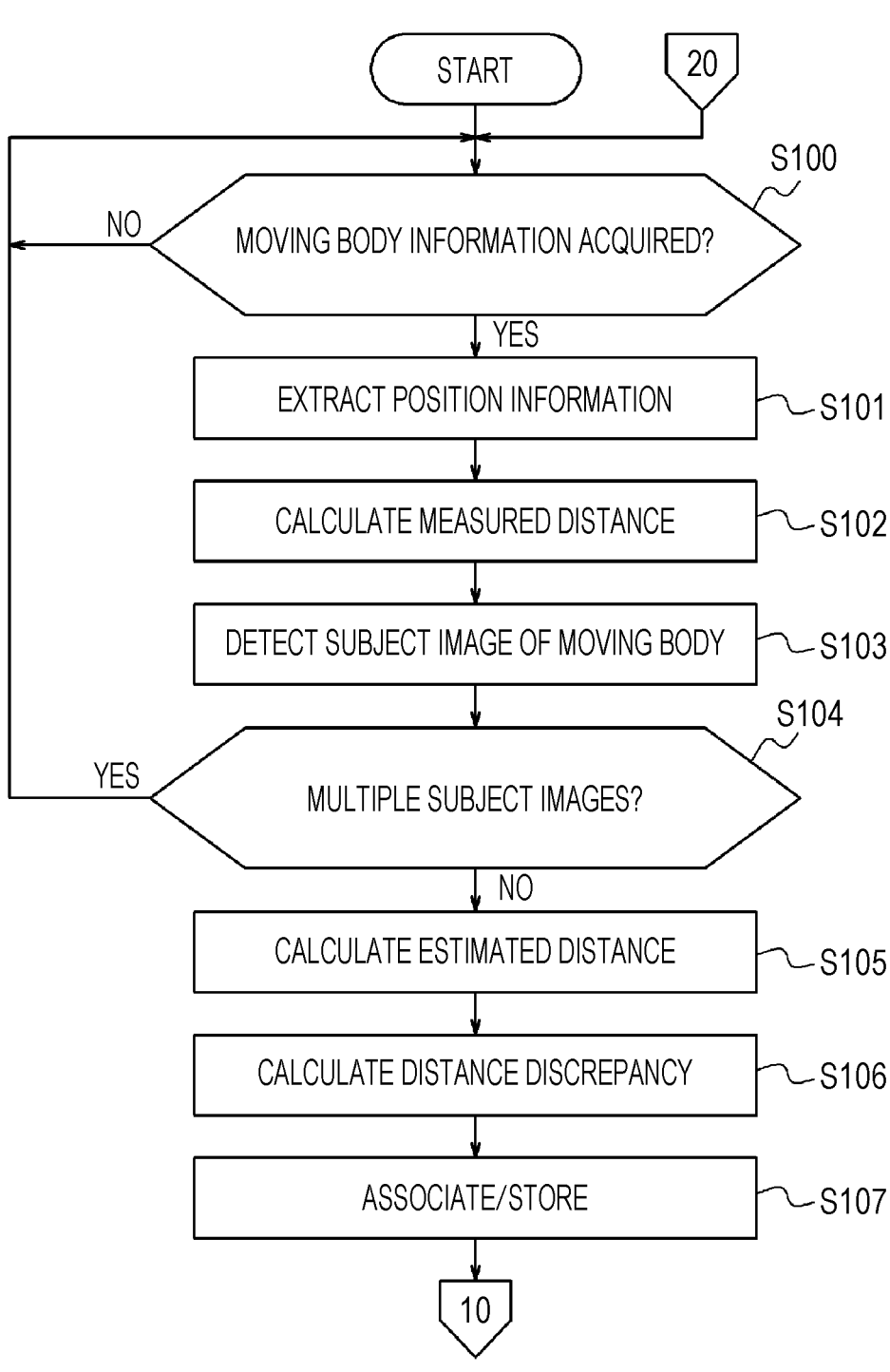
FIG. 5 is a first flowchart for explaining a correction process in an initial setup mode executed by the controller in FIG. 2.

The following uses the flowcharts in FIGS. 5 and 6 to describe a correction process in the initial setup mode that the controller 20 executes in the present embodiment. The correction process in the initial setup mode starts in response to the switching of the operating mode using an input device after installation of the observation device 10.

In step S100, the controller 20 determines whether moving body information is acquired. If the controller 20 has not acquired moving body information, the process returns to step S100. If the controller 20 has acquired moving body information, the process proceeds to step S101.

In step S101, the controller 20 extracts position information from the moving body information determined to be acquired in step S100. After extraction, the process proceeds to step S102.

In step S102, the controller 20 calculates the measured distance on the basis of the position information extracted in step S101. After calculation of the measured distance, the process proceeds to step S103.

In step S103, the controller 20 detects a subject image of the moving body 13 from an image in substantially the same time period as the moving body information determined to be acquired in step S100. After detection of a subject image, the process proceeds to step S104.

In step S104, the controller 20 determines whether subject images of a plurality of moving bodies 13 are detected in step S103. If the controller 20 has detected subject images of a plurality of moving bodies 13, the process returns to step S100. If the controller 20 has detected a subject image of a single moving body 13 without detecting subject images of a plurality of moving bodies 13, the process proceeds to step S105.

In step S105, the controller 20 uses distance information stored in the storage 18 to calculate an estimated distance from the image position of the subject image detected in step S103. After calculation of the estimated distance, the process proceeds to step S106. Note that the above assumes that at the start of the initial setup mode, the storage 18 is storing distance information generated on the premise that the observation device 10 observes a flat road surface.

In step S106, the controller 20 calculates the distance discrepancy by taking the difference between the measured distance calculated in step S102 and the estimated distance calculated in step S105. After calculation of the distance discrepancy, the process proceeds to step S107.

In step S107, the controller 20 associates the distance discrepancy calculated in step S106 with the measured distance calculated in step S102 and the image position used to calculate the estimated distance calculated in step S105.

The controller 20 stores the measured distance, the image position, and the distance discrepancy in association with each other in the storage 18. After the associating and storing ends, the process proceeds to step S108.

In step S108, the controller 20 determines whether the distance discrepancy calculated in step S106 is at or above the first threshold. If the distance discrepancy is at or above the first threshold, the process proceeds to step S109. If the distance discrepancy is not at or above the first threshold, the process proceeds to step S110.

In step S109, the controller 20 corrects the information pertaining to distance in the distance information corresponding to a specific image position on the basis of the measured distance calculated in step S102. The specific image position is the image position of the subject image of the moving body 13 detected in step S103. After correction of the distance information, the process proceeds to step S110.

In step S110, the controller 20 determines whether the image position stored in the storage 18 is different from the image position associated in step S107. If the image position is different, the process proceeds to step S111. If the image position is the same, the process proceeds to step S116.

In step S111, the controller 20 determines whether the storage 18 is storing a plurality of image positions that are different from the image position associated in step S107. If the storage 18 is storing a single different image position, the process proceeds to step S112. If the storage 18 is storing a plurality of different image positions, the process proceeds to step S113.

In step S112, the controller 20 associates the image position associated with the measured distance stored in the storage 18 with the image position associated in step S107. After association, the process proceeds to step S114.

In step S113, the controller 20 associates, with the image position associated in step S107, the image position associated with the measured distance that has the smallest difference from the measured distance calculated in step S107 from among the plurality of measured distances stored in the storage 18. After association, the process proceeds to step S114.

In step S114, the controller 20 determines whether at least one of the distance discrepancies corresponding to a respective one of the image positions associated in step S112 or step S113 is at or above the first threshold. If at least one of the distance discrepancies is at or above the first threshold, the process proceeds to step S115. If both of the distance discrepancies are not at or above the first threshold, the process proceeds to step S116.

In step S115, the controller 20 corrects the information pertaining to distance in the distance information corresponding a specific range of image positions on the basis of the measured distance corresponding to each image position associated in step S112 or step S113. The specific range of image positions is the range between the image positions associated in step S112 or step S113. After correction of the distance information, the process proceeds to step S116.

In step S116, the controller 20 determines whether moving body information has been acquired from ten moving bodies 13. If the controller 20 has not acquired moving body information, the process returns to step S100. If the controller 20 has acquired moving body information, the correction process in the initial setup mode ends.

Figure 7:
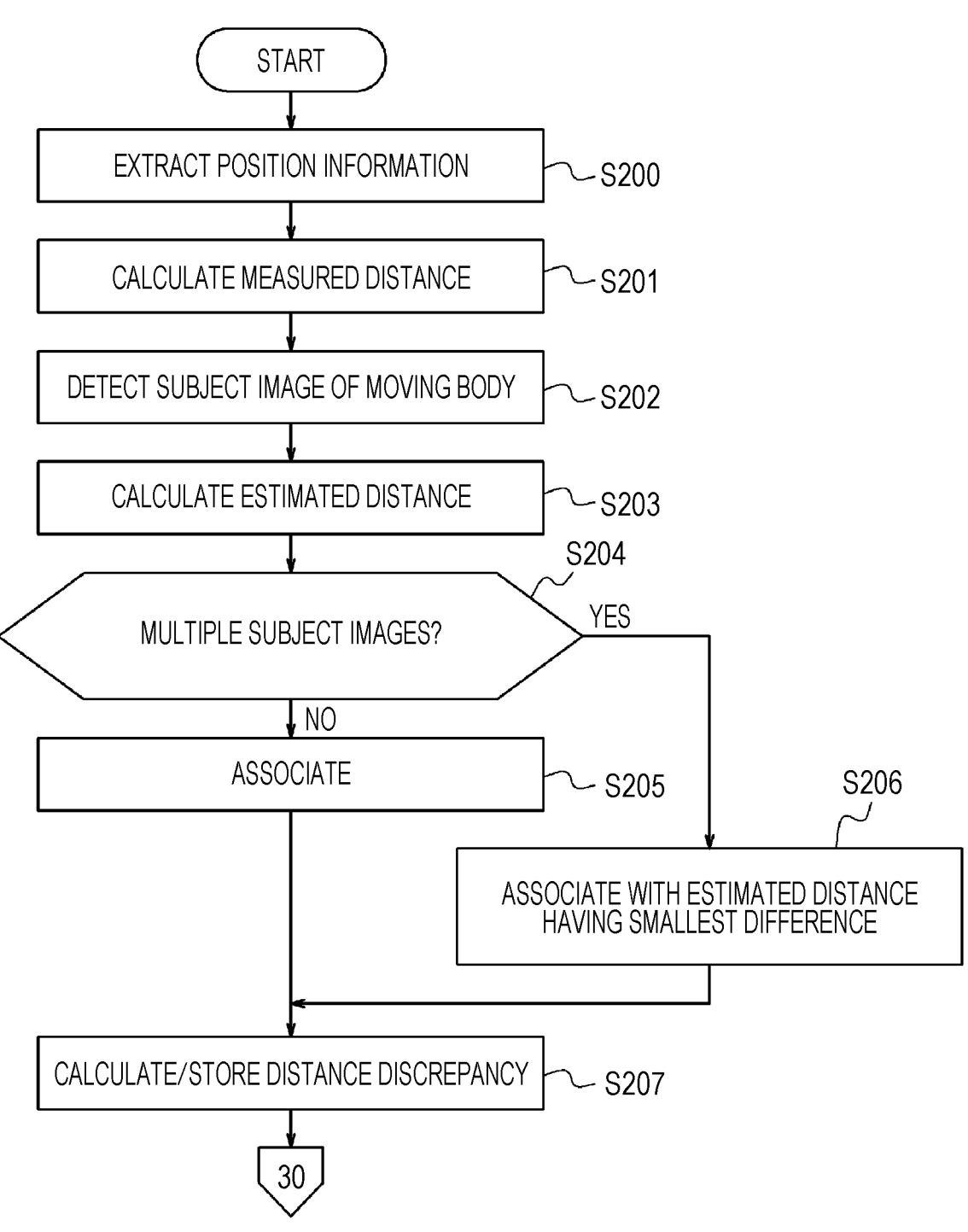
FIG. 7 is a first flowchart for explaining a correction process in a normal mode executed by the controller in FIG. 2.
Figure 8:
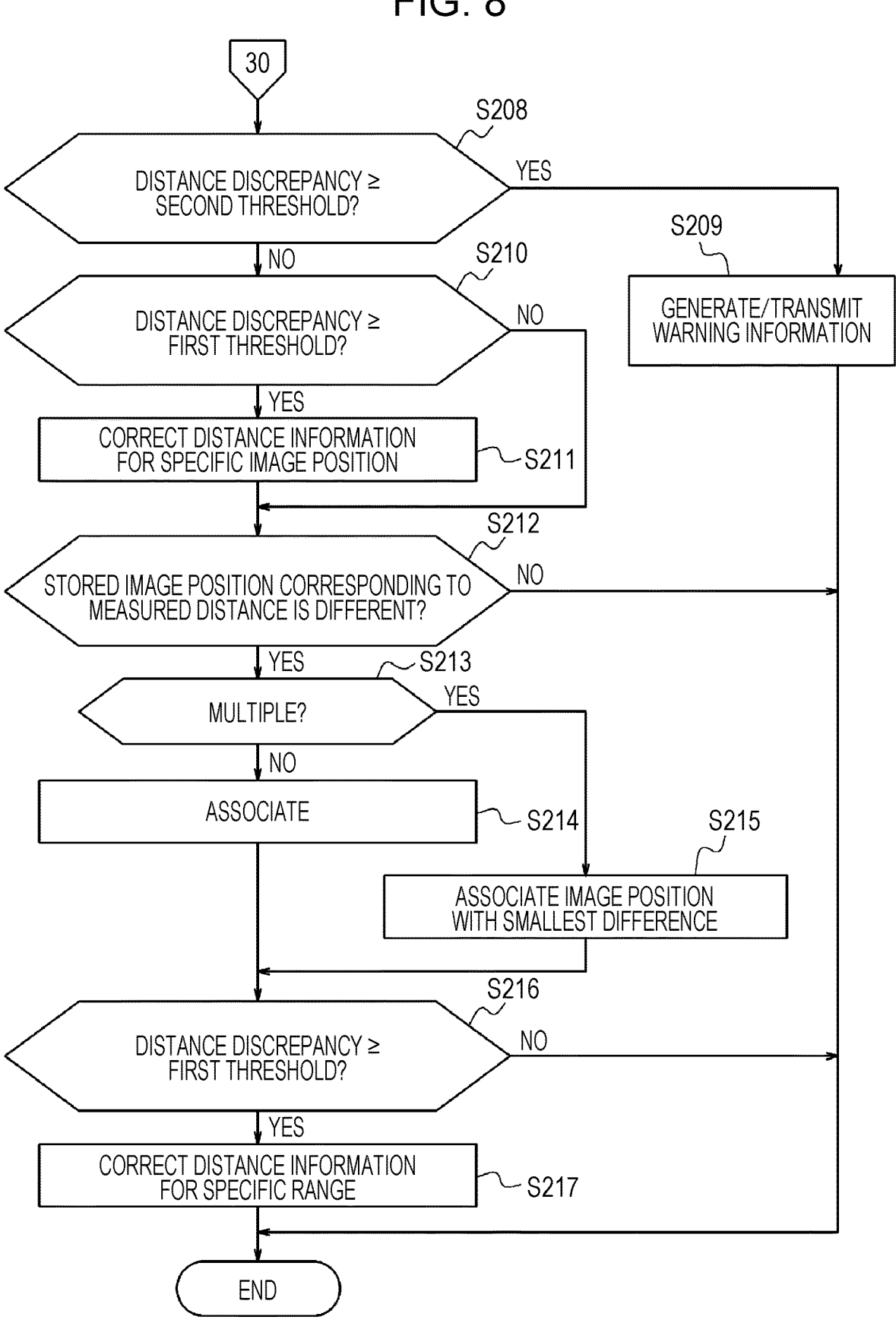
FIG. 8 is a second flowchart for explaining a correction process in a normal mode executed by the controller in FIG. 2.

The following uses the flowcharts in FIGS. 7 and 8 to describe a correction process in the normal mode that the controller 20 executes in the present embodiment. The correction process in the normal mode starts in response to the acquisition of moving body information after the end of the initial setup mode.

In step S200, the controller 20 extracts position information from the newly acquired moving body information. After extraction, the process proceeds to step S201.

In steps S201 and S202, the controller 20 performs the same control as in steps S102 and S103 of the correction process in the initial setup mode. After detection of a subject image in step S202, the process proceeds to step S203.

In step S203, the controller 20 uses distance information stored in the storage 18 to calculate an estimated distance from the image position of the subject image detected in step S202. After calculation of the estimated distance, the process proceeds to step S204.

In step S204, the controller 20 determines whether subject images of a plurality of moving bodies 13 are detected in step S202. If the controller 20 has detected a subject image of a single moving body 13 without detecting subject images of a plurality of moving bodies 13, the process proceeds to step S205. If the controller 20 has detected subject images of a plurality of moving bodies 13, the process proceeds to step S206.

In step S205, the controller 20 associates the measured distance calculated in step S201 with the estimated distance calculated in step S203. After association, the process proceeds to step S207.

In step S206, the controller 20 associates, with the measured distance calculated in step S201, the estimated distance that has the smallest difference from that measured distance from among the estimated distances calculated in step S203 for each of the plurality of subject images of moving bodies 13 detected in step S202. After association, the process proceeds to step S207.

In step S207, the controller 20 calculates the distance discrepancy by taking the difference between the measured distance and the estimated distance associated in step S205 or step S206. The controller 20 stores the measured distance calculated in step S201, the image position used to calculate the estimated distance associated with that measured distance in step S205 or S206, and the calculated distance discrepancy in association with each other in the storage 18. After the distance discrepancy calculation and storage, the process proceeds to step S208.

In step S208, the controller 20 determines whether the distance discrepancy calculated in step S207 is at or above the second threshold. If the distance discrepancy is at or above the second threshold, the process proceeds to step S209. If the distance discrepancy is not at or above the second threshold, the process proceeds to step S210.

In step S209, the controller 20 generates warning information. The controller 20 controls the network IF 21 to transmit the generated warning information to an external server. After generation and transmission, the correction process in the normal mode ends.

In step S210, the controller 20 determines whether the distance discrepancy calculated in step S207 is at or above the first threshold. If the distance discrepancy is at or above the first threshold, the process proceeds to step S211. If the distance discrepancy is not at or above the first threshold, the process proceeds to step S212.

In step S211, the controller 20 corrects the information pertaining to distance in the distance information corresponding to a specific image position on the basis of the measured distance calculated in step S201. The specific image position is the image position of the subject image of the moving body 13 detected in step S202. After correction of the distance information, the process proceeds to step S212.

In step S212, the controller 20 determines whether the image position stored in the storage 18 is different from the image position associated in step S205 or step S206. If the image position is the same, the process proceeds to step S213. If the image position is different, the correction process in the normal mode ends.

In step S213, the controller 20 determines whether the storage 18 is storing a plurality of image positions that are different from the image position associated in step S205 or step S206. If the storage 18 is storing a single different image position, the process proceeds to step S214. If the storage 18 is storing a plurality of different image positions, the process proceeds to step S215.

In step S214, the controller 20 associates the image position associated with the measured distance stored in the storage 18 with the image position associated in step S205 or step S206. After association, the process proceeds to step S216.

In step S215, the controller 20 associates, with the image position associated in step S205 or S206, the image position associated with the measured distance that has the smallest difference from the measured distance calculated in step S205 or S206 from among the plurality of measured distances stored in the storage 18. After association, the process proceeds to step S216.

In step S216, the controller 20 determines whether at least one of the distance discrepancies corresponding to a respective one of the image positions associated in step S214 or step S215 is at or above the first threshold. If at least one of the distance discrepancies is at or above the first threshold, the process proceeds to step S217. If both of the distance discrepancies are not at or above the first threshold, the correction process in the normal mode ends.

In step S216, the controller 20 corrects the information pertaining to distance in the distance information corresponding a specific range of image positions on the basis of the measured distance corresponding to each image position associated in step S214 or step S215. The specific range of image positions is the range between the image positions associated in step S214 or step S215. After correction of the distance information, the correction process in the normal mode ends.

In one embodiment having a configuration like the above, the observation device 10 includes the storage 18, the communicator (acquirer) 19, and the controller 20. The storage 18 stores distance information, that is, a relationship between an image position in an image captured by the imaging device 17 and information pertaining to distance. The communicator (acquirer) 19 acquires, from the moving body 13, position information pertaining to the spatial position of the moving body 13. The controller 20 corrects the distance information by using the measured distance when the distance discrepancy between the measured distance corresponding to the position information and the estimated distance estimated on the basis of the image position and distance information of the moving body 13 in the image is at or above the first threshold. According to such a configuration, the observation device 10 may correct a shape difference in the vertical direction due to the grade or the like of the real plane rp. Consequently, the observation device 10 may have improved distance estimation accuracy.

In the present embodiment, if at least one distance discrepancy for two different image positions is at or above the first threshold, the observation device 10 corrects the distance information corresponding to an inner image position between the two image positions by using the two measured distances corresponding respectively to the two image positions. According to such a configuration, the observation device 10 may correct a difference in the shape of the real plane rp for not only the two image positions corresponding respectively to the two calculated measured distances, but also the area between the two image positions. Consequently, the observation device 10 may have improved distance estimation accuracy over a wide range.

In the present embodiment, the observation device 10 corrects the distance information corresponding to an inner image position by using the image position closest to the image position where the distance discrepancy is at or above the first threshold from among image positions where the distance discrepancy is below the first threshold. Correcting the distance information corresponding to an image position where the distance discrepancy is below the first threshold by using the measured distance corresponding to a different image position where the distance discrepancy is at or above the first threshold results in lower estimation accuracy of a distance calculated from the image position where the distance discrepancy is below the first threshold. To address such an event, the observation device 10 having the above configuration may reduce image positions where the distance discrepancy is below the first threshold from the range of inner image positions to be corrected using a measured distance corresponding to a different image position where the distance discrepancy is at or above the first threshold. Consequently, the observation device 10 may have a reduced range where the distance estimation accuracy is lower.

Figure 9:
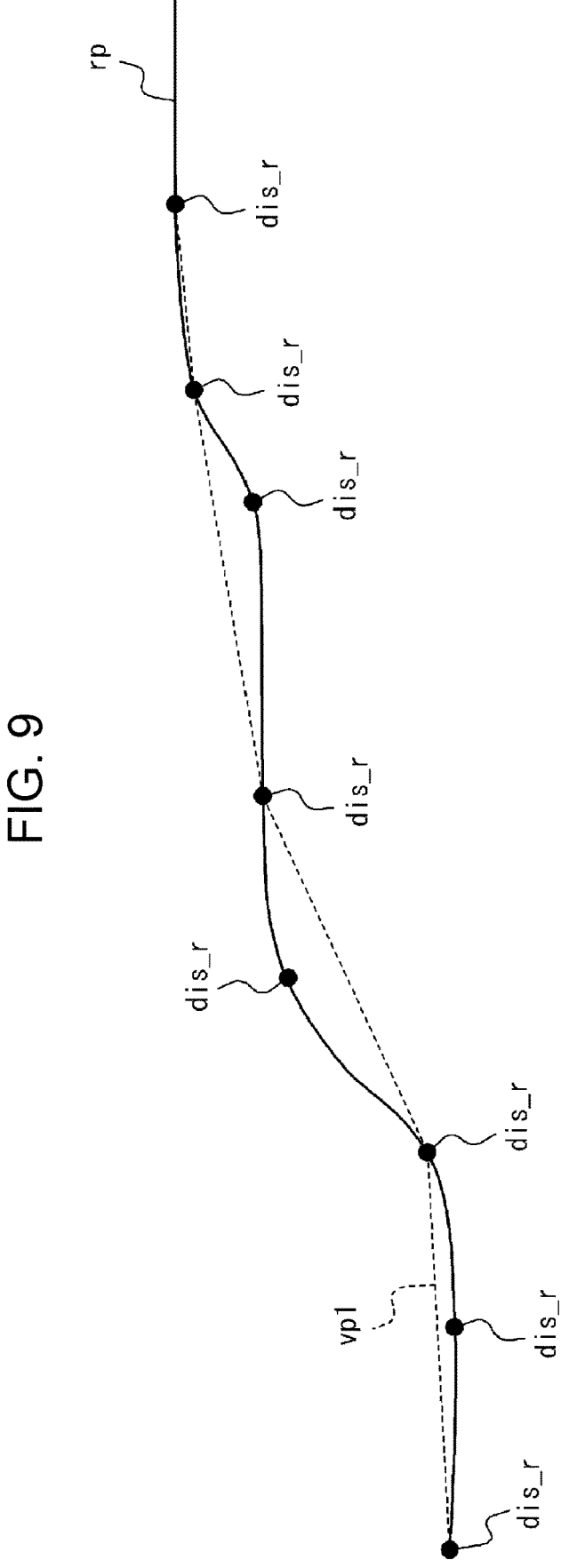
FIG. 9 is a diagram illustrating a distance estimated on the basis of corrected distance information when distance information corresponding to an inner image position is corrected using a measured distance that does not have the smallest difference from the measured distance corresponding to a newly calculated distance discrepancy from among a plurality of measured distances.
Figure 10:
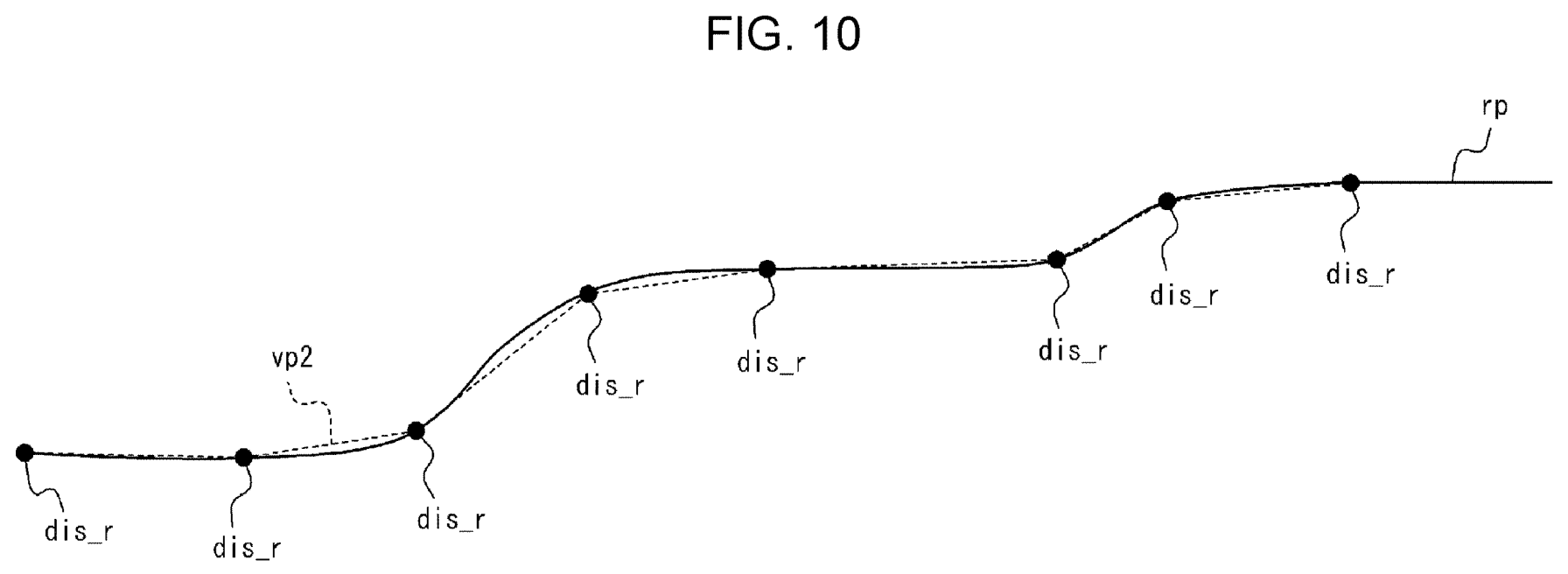

In the present embodiment, the storage 18 may store a plurality of measured distances and the observation device 10 may newly calculate a distance discrepancy. In this case, the observation device 10 corrects the distance information corresponding to the inner image position described above by using the measured distance that has the smallest difference from the measured distance corresponding to the newly calculated distance discrepancy from among the plurality of measured distances. For example, as illustrated in FIG. 9, consider the case of calculating a measured distance dis_r in eight locations with respect to the real plane rp. In this case, if the observation device 10 corrects the distance information in two locations, spaced one location apart, in order of shortest measured distance, the observation device 10 estimates distance on the basis of a first virtual plane vp1. The first virtual plane vp1 has a relatively large distance discrepancy from the real plane rp. On the other hand, as illustrated in FIG. 10, the observation device 10 with the above configuration may estimate distance on the basis of a second virtual plane vp2. The second virtual plane vp2 has a smaller distance discrepancy from the real plane rp compared to the first virtual plane vp1. Consequently, the observation device 10 may have improved distance estimation accuracy.

In the present embodiment, an image may contain a plurality of images of moving bodies 13. In this case, the observation device 10 corrects the distance information on the basis of the measured distance and the estimated distance that has the smallest difference from the measured distance from among the estimated distances corresponding respectively to the plurality of images of moving bodies 13. According to such a configuration, upon detecting a plurality of subject images of moving bodies 13 from an image, the observation device 10 may appropriately determine which subject image to use to correct the distance information. Consequently, the observation device 10 may correct the distance information even when detecting a plurality of subject images of moving bodies 13 from an image.

In the present embodiment, if the distance discrepancy is at or above a second threshold that is higher than the first threshold, the observation device 10 generates warning information warning that the observation device 10 is abnormal. According to such a configuration, the observation device 10 may issue a warning about a suspected abnormality in the observation device 10 itself or abnormal installation state of the observation device 10.

In the present embodiment, if the distance discrepancy is at or above the second threshold during initial setup, the observation device 10 stops generating warning information and corrects the distance information. When correcting the distance information during initial setup, the distance discrepancy may be relatively large. To address such an event, the observation device 10 does not determine that the observation device 10 is abnormal during initial setup. Thus, the observation device 10 may reduce unnecessary warnings.

An embodiment according to the present disclosure has been described on the basis of the drawings and examples, but note that it would be easy for a person skilled in the art to make various variations or revisions on the basis of the present disclosure. Consequently, it should be understood that these variations or revisions are included in the scope of the present disclosure. For example, the functions and the like included in each component, each step, and the like may be rearranged in logically non-contradictory ways, and it is possible to combine a plurality of components, steps, or the like into one or divide a component, step, or the like.

In the present disclosure, qualifiers such as "first" and "second" are identifiers for distinguishing configurations. The numerals denoting the configurations distinguished by qualifiers such as "first" and "second" in the present disclosure can be interchanged. For example, the first direction can interchange the identifiers "first" and "second" with the second direction. The identifiers are exchanged at the same time. The configurations are still distinguished after the exchange of the identifiers. The identifiers may be removed. The configurations with the identifiers removed therefrom are distinguished by signs. The description of identifiers such as "first" and "second" in the present disclosure shall not be used as a basis for interpreting the order of the configurations or the existence of identifiers with smaller numbers.

Many aspects of the content of the present disclosure are illustrated as a series of operations to be executed by a computer system or other hardware capable of executing program instructions. The computer system or other hardware includes, for example, a general-purpose computer, a personal computer (PC), a special-purpose computer, a workstation, a personal communications system (PCS), a mobile (cellular) phone, a mobile phone with data processing functions, an RFID receiver, a game console, an electronic notepad, a laptop computer, a Global Positioning System (GPS) receiver, or some other programmable data processing device. Note that in each embodiment, various operations are performed by a dedicated circuit (for example individual logic gates interconnected to perform a specific function) implemented with program instructions (software), by a logic block or program module executed by at least one processor, or the like. The at least one processor that executes the logic block, program module, or the like includes, for example, at least one microprocessor, central processing unit (CPU), application-specific integrated circuit (ASIC), digital signal processor (DSP), programmable logic device (PLD) field-programmable gate array (FPGA), processor, controller, microcontroller, microprocessor, electronic device, or other device designed to execute the functions described herein, and/or a combination of any of the above. The embodiment illustrated herein is implemented by hardware, software, firmware, middleware, microcode, or a combination of any of the above. An instruction may be program code or a code segment for executing a required task. An instruction can be stored in a non-transitory machine-readable storage medium or other medium. A code segment may represent any combination of procedures, functions, subprograms, programs, routines, subroutines, modules, software packages, classes or instructions, data structures or program statements. A code segment transmits and/or receives information, a data argument, a variable, or stored content to and/or from another code segment or a hardware circuit, thereby connecting the code segment to the other code segment or hardware circuit.

A circuit configuration such as a transmitter, receiver, transmission unit, reception unit, or transceiver provides functionality by using any of various wireless communication networks, such as a WWAN, WLAN, or WPAN, for example. The WWAN can be a CDMA network, TDMA network, FDMA network, OFDMA network, SC-FDMA network, or the like. The CDMA network can implement one or more radio access technologies (RATs), such as CDMA2000 or Wideband-CDMA (W-CDMA). CDMA2000 includes the IS-95. IS-2000, and IS-856 standards. The TDMA network can implement GSM, Digital Advanced Phone System (D-AMPS), or other RATs. GSM and W-CDMA are described in documentation published by a consortium called the 3rd Generation Partnership Project (3GPP). CDMA2000 is described in documentation published by a consortium called the 3rd Generation Partnership Project 2 (3GPP2). The WLAN can be an IEEE 802.11× network. The WPAN can be a Bluetooth network, an IEEE 802.15× network, or other type of network. CDMA can be implemented as a radio technology such as Universal Terrestrial Radio Access (UTRA) or CDMA2000. TDMA can be implemented by a radio technology such as GSM/General Packet Radio Service (GPRS)/Enhanced Data Rates for GSM Evolution (EDGE). OFDMA can be implemented by a radio technology such as the Institute of Electrical and Electronics Engineers (IEEE) 802.11 (Wi-Fi), IEEE 802.16 (WiMAX), IEEE 802.20, or Evolved UTRA (E-UTRA). These technologies can be used for any combination of WWAN, WLAN, and/or WPAN. These technologies can be implemented for use with an Ultra Mobile Broadband (UMB) network, a High Rate Packet Data (HRPD) network, a CDMA2000 1× network, GSM, Long-Term Evolution (LTE), or the like.

Note that the description herein discloses a system having various modules and/or units to perform specific functions and schematically illustrates these modules and units to briefly describe the functionality thereof. However, it should be understood that the description here does not necessarily illustrate specific hardware and/or software. In that sense, these modules, units, and other components may be hardware and/or software implemented to substantially perform the specific functions described herein. The various functions of different components may be hardware and/or software in any combination or in isolation, and can be used separately or in any combination with each other. Input/output, or an I/O device or user interface, including but not limited to a keyboard, a display, a touch screen, a pointing device, and the like, can be connected to the system directly or through an intervening I/O controller. In this way, various aspects of the content of the present disclosure can be implemented in many different forms, and all such forms are to be included in the scope of the content of the present disclosure.

REFERENCE SIGNS 10 observation device
11 communication system
12 road
13 moving body
14 pedestrian
15 traffic signal
16 pedestrian crossing
17 imaging device
18 storage
19 acquirer
20 controller
21 communicator
22 structure
dr1 first direction
dr2 second direction
dr3 third direction
dr4 fourth direction
rp real plane
ox optical axis
vp virtual plane

The invention claimed is:

1. An observation device for estimating a distance to an observation target in a predetermined area, the observation device comprising:
  an imaging device configured to generate an image through image capture of a space containing the predetermined area;
  storage configured to store distance information, the distance information being a relationship between an image position in the image captured by the imaging device and information pertaining to the distance;
  an acquirer configured to acquire, from a moving body, position information pertaining to a spatial position of the moving body; and
  a controller configured to correct the distance information by using a measured distance corresponding to the position information when a distance discrepancy between the measured distance and an estimated distance is at or above a first threshold, the estimated distance being obtained on a basis of an image position of the moving body in the image and the distance information.

2. The observation device according to claim 1, wherein the controller is configured to correct the distance information by using the measured distance to correct information pertaining to a distance corresponding to the image position that corresponds to the estimated distance.

3. The observation device according to claim 1, wherein when at least one distance discrepancy for two different image positions is at or above the first threshold, the controller is configured to correct distance information corresponding to an inner image position between the two different image positions by using two measured distances corresponding respectively to the two different image positions corresponding respectively to the two image positions.

4. The observation device according to claim 3, wherein the controller is configured to correct an estimated distance corresponding to the inner image position on a basis of a difference between the two measured distances and a difference between two estimated distances corresponding to the two different image positions, a shorter of the two measured distances, and a difference between the shorter of the two measured distances and the estimated distance corresponding to the inner image position.

5. The observation device according to claim 4, wherein the controller is configured to:
  align, with the measured distance, information pertaining to a distance for two image positions corresponding to a position where the measured distance is acquired; and
  set information pertaining to a distance for a plurality of inner image positions according to a distance in the image to each of the plurality of inner image positions.

6. The observation device according to claim 3, wherein the controller is configured to correct the distance information corresponding to the inner image position by using an image position closest to an image position where a distance discrepancy is at or above the first threshold from among image positions where a distance discrepancy is below the first threshold from among image positions where the distance discrepancy is below the first threshold.

7. The observation device according to claim 1, wherein when the image contains a plurality of images of moving bodies, the controller is configured to correct the distance information on a basis of the measured distance and an estimated distance that has a smallest difference from the measured distance from among estimated distances corresponding respectively to the plurality of images of moving bodies.

8. The observation device according to claim 1, wherein when the distance discrepancy is at or above a second threshold that is higher than the first threshold, the controller is configured to generate warning information warning that the observation device is abnormal.

9. The observation device according to claim 8, wherein the controller is configured to:
  switch an operating mode between an initial setup mode and a normal mode; and
  correct the distance information without generating the warning information when the distance discrepancy is at or above the second threshold in the initial setup mode, and generate the warning information when the distance discrepancy is at or above the second threshold in the normal mode.

* * * * *